United States Patent
Ikezawa

(10) Patent No.: US 7,135,843 B2
(45) Date of Patent: Nov. 14, 2006

(54) SWITCHING POWER SUPPLY DEVICE

(75) Inventor: Katsuya Ikezawa, Osaka (JP)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/111,020

(22) Filed: Apr. 20, 2005

(65) Prior Publication Data

US 2005/0236904 A1 Oct. 27, 2005

(30) Foreign Application Priority Data

Apr. 26, 2004 (JP) ............................. 2004-130283

(51) Int. Cl.
 *G05F 1/40* (2006.01)
(52) U.S. Cl. ..................................................... 323/282
(58) Field of Classification Search ................ 323/222, 323/225, 266, 271, 282, 283, 351
 See application file for complete search history.

(56) References Cited

U.S. PATENT DOCUMENTS

| | | | |
|---|---|---|---|
| 5,734,258 A | * | 3/1998 | Esser .......................... 323/224 |
| 5,831,418 A | | 11/1998 | Kitagawa |
| 6,108,225 A | * | 8/2000 | Iwahori et al. ................ 363/98 |
| 6,275,016 B1 | | 8/2001 | Ivanov |
| 6,636,431 B1 | * | 10/2003 | Seki et al. ..................... 363/65 |
| 6,717,390 B1 | * | 4/2004 | Miyazaki et al. ........... 323/286 |
| 6,977,488 B1 | * | 12/2005 | Nogawa et al. ............. 323/271 |

\* cited by examiner

*Primary Examiner*—Adolf Berhane
(74) *Attorney, Agent, or Firm*—J. Dennis Moore; W. James Brady; Frederick J. Telecky, Jr.

(57) ABSTRACT

The circuit provides a type of switching power supply device that can reduce the ripple voltage generated in the output when switching is performed in the step-down/step-up control mode. Control part (CTRL) operates as follows: corresponding to the detection value of input potential detecting part 20, the step-down control mode/step-up control mode is switched; in each control mode, the clock signal generated by comparator 50 corresponding to output potential Vout is fed back to primary circuit (PRI)/secondary circuit (SEC); in this case, corresponding to the control mode, multiplexer 60 switches the input sign of transconductance amplifier 40 corresponding to the control mode.

6 Claims, 6 Drawing Sheets

SWITCHING POWER SUPPLY DEVICE

CROSS REFERENCE TO RELATED APPLICATIONS

This application claims priority under 35 USC § 119 of Japanese Application Serial No. 2004-130283, filed Apr. 26, 2004.

FIELD OF THE INVENTION

The present invention pertains to a type of switching power supply device. Especially, the present invention pertains to a type of switching power supply device having an H bridge type switching circuit that has semiconductor switching elements set on the input side and output side, two on each side.

BACKGROUND OF THE INVENTION

In the following, explanation will be provided for a switching power supply device in the prior art with reference to annexed figures.

FIG. 9 is a diagram illustrating an example of the constitution of switching power supply device $1a$ of the prior art. As shown in this figure, switching power supply device $1a$ is a power supply device for obtaining a prescribed stable DC voltage from a DC voltage that varies over a wide range and is obtained from a nickel-mercury battery or other battery (Bat in the figure) set on the input side.

As shown in the figure, switching power supply device $1a$ contains an H bridge type switching circuit composed of semiconductor switching elements Tr1, Tr2 set on the input side via inductance L, and semiconductor switching elements Tr3, Tr4 set on the output side. By controlling the ON state of said semiconductor switching elements, it is possible to realize step-up or step-down control. For example, the semiconductor switching elements can be controlled so as to obtain a stable 3 V output voltage from an input voltage that varies over a wide range of 1.5–5 V.

A PWM control signal to be explained later is fed from control part $10a$ via buffer Buf1 and inverter Inv2 to semiconductor switching elements Tr1 and Tr2 set on the input side. Consequently, semiconductor switching elements Tr1 and Tr2 are controlled so that one is ON while the other is OFF corresponding to the pulse width of the PWM control signal fed to the control part.

In the following, as shown in FIG. 9, the controller on the input side and composed of semiconductor switching elements Tr1, Tr2, buffer Buf1 and inverter Inv2 will be known as primary circuit (PR1).

The PWM control signal to be explained later is fed from control part $10a$ via buffer Buf3 and inverter Inv4 to semiconductor switching elements Tr3 and Tr4 set on the output side. Consequently, semiconductor switching elements Tr3 and Tr4 are controlled so that one is ON while the other is OFF corresponding to the pulse width of the PWM control signal fed to the control part.

In the following, as shown in FIG. 9, the controller on the input side composed of semiconductor switching elements Tr3, Tr4, buffer Buf3 and inverter Inv4 will be known as secondary circuit (SEC).

Input potential detecting part 20 always detects input potential Vin based on a prescribed reference potential, and it feeds the detected input potential Vin to control part $10a$. As to be explained later, control part $10a$ switches the control mode corresponding to input potential Vin detected by input potential detecting part 20.

Transconductance amplifier 40 is a so-called Gm amplifier.

As shown in FIG. 9, the positive terminal of transconductance amplifier 40 has prescribed reference voltage Vref input to it, and a voltage obtained by voltage dividing output potential Vout by resistors RF and RS is input to its negative terminal.

Resistor R1 that generates a potential corresponding to the current output from transconductance amplifier 40 and capacitor C1 that performs phase compensation and is connected in series to said resistor R1 are connected to the output terminal of transconductance amplifier 40. Said capacitor C1 for phase compensation should have a relatively large capacitance, such as a capacitance of about 10 nF.

Also, the output terminal of transconductance amplifier 40 is connected to the negative terminal of comparator $50a$. Consequently, the negative terminal of comparator $50a$ becomes the potential of the output terminal of transconductance amplifier 40 that has its phase compensated. On the other hand, a triangular signal with a prescribed period and a prescribed amplitude and generated in triangular wave generating part 30 is input to the positive terminal of comparator $50a$.

As a result, comparator $50a$ generates a clock signal with a duty ratio corresponding to the potential of the output terminal of transconductance amplifier 40. As shown in FIG. 9, the output terminal of comparator $50a$ is connected to output terminal c of control part $10a$ and, as to be explained later, said clock signal is inverted or not inverted corresponding to the control mode and is fed as an FB_PWM signal to either of the primary circuit/secondary circuit.

Control part $10a$ switches the control mode corresponding to input potential Vin detected by input potential detecting part 20. That is, when it is judged that input potential Vin is higher than target output potential Vout (Vin>Vout), control is performed to switch the control mode to the step-down control mode. On the other hand, when it is judged that input potential Vin is lower than target output potential Vout (Vin<Vout), control is performed to switch the control mode to the step-up control mode.

More specifically, in the step-down control mode, control part $10a$ takes the clock signal sent from comparator $50a$ as an FB_PWM signal, and feeds it to the primary circuit, and, simultaneously, it feeds an FF_PWM signal with a pulse width that can obtain a virtual output potential Vout (virtual Vout) to the secondary circuit.

Virtual Vout is the average potential on the side of the secondary circuit, and it satisfies the following relationship:

$$\text{VirtualVout} = \text{Vin} \times FB\text{duty} \quad (1)$$

On the other hand, in the step-up control mode, control part $10a$ takes the signal obtained by inverting the clock signal sent from comparator $50a$ as an FB_PWM signal and feeds it to the secondary circuit, and, simultaneously, it feeds an FF_PWM signal with a pulse width that can obtain a virtual input potential Vin (virtual Vin) to the primary circuit.

Virtual Vin is the average potential on the side of the primary circuit, and the following relationship is satisfied.

$$\text{VirtualVin} = \text{Vout} \times FB\text{duty} \quad (2)$$

Also, the processing for inverting the clock signal output from comparator 50a and generating the FB_PWM signal is performed by including a logic circuit containing an inverter in control part 10a.

FIG. 10 is an equivalent circuit indicating the connection state and feeding state of a PWM signal when switching power supply device 1a operates in the step-down control mode.

In the step-up control mode with input potential Vin higher than output potential Vout, as shown in the figure, an FB_PWM signal with duty ratio (FBduty) corresponding to output potential Vout is fed to the primary circuit, and, simultaneously, an FF_PWM signal is fed to the secondary circuit. As a result, switching power supply device 1a performs step-down control to obtain target output potential Vout.

FIG. 11 is a diagram illustrating the state of connection and the PWM signal feeding state in case switching power supply device 1a performs the step-up control mode of operation.

In practice, the clock signal output from comparator 50a is inverted, and the obtained signal is fed as an FB_PWM signal to the secondary circuit. In order to simplify the description, different from comparator 50a shown in FIG. 10, for comparator 50a shown in FIG. 11, the positive terminal and negative terminal are reversed in the description, and it can be described that the output is equivalently fed to the secondary circuit directly.

When input potential Vin becomes lower then output potential Vout, the control mode becomes the step-up control mode, and, as shown in the figure, while the FB_PWM signal of duty ratio (FBduty) corresponding to the output voltage is fed to the secondary circuit, the FF_PWM signal is fed to the primary circuit. As a result, switching power supply device 1a performs step-up control so that target output potential Vout is obtained.

However, in said conventional switching power supply device 1a of the prior art, when the control mode is switched, a ripple voltage appear at the output of switching power supply device 1a due to the transient characteristics of the potential at the output terminal of transconductance amplifier 40 when the control mode is switched. That is, due to the presence of phase compensating capacitor C1 with a relatively large capacitance, it is impossible to realize stable control of output potential Vout in the transient region from immediately after switching of the control mode to stabilization of the potential at the output terminal of transconductance amplifier 40. This is undesired.

In the following, explanation will be provided in more detail on the aforementioned problem with respect to FIG. 12.

FIG. 12 illustrates the timing charts of various signal waveforms before and after switching time Tc of the control mode. (a) shows potential V40 at the output terminal of transconductance amplifier 40; (b) shows triangular signal Vtri input to comparator 50a; (c) shows the FB_PWM signal; (d) shows the FF_PWM signal; and (e) shows output potential Vout. The maximum potential of triangular signal Vtri is called Vtri2, and the minimum potential is called Vtri1.

As shown in FIG. 12, before time Tc, the relationship of input potential Vin>output potential Vout exists, and control part 10a operates in the step-down control mode. After time Tc, the relationship of input potential Vin<output potential Vout exists, and control part 10a operates in the step-up control mode. In this case, duty ratio FBduty of the FB_PWM signal is always set at the target value of 0.9.

Before time Tc, in order to stabilize potential V40 of the output terminal of transconductance amplifier 40, an FB_PWM signal with duty ratio FBduty shown in following formula (1) is fed to the primary circuit.

$$FBduty = (V40 - Vtri1)/(Vtri2 - Vtri1) \quad (3)$$

For example, if Vtri2=1.45 V and Vtri1=0.85 V, when duty ratio FBduty of the FB_PWM signal is said 0.9, according to said formula (3), one has V40=1.39 V.

Then, at time Tc when input potential Vin falls to obtain the relationship of input potential Vin<output potential Vout, control part 10a starts the step-up control mode of operation. That is, immediately after time Tc, the clock signal output from comparator 50a is inverted and fed to the secondary circuit.

If a phase compensating capacitor C1 is not connected to the output terminal of transconductance amplifier 40, control is performed so that potential V40 of its output terminal quickly changes from 1.39 V (FBduty=0.9) before time Tc to 0.91 V.

Also, in the step-up control mode, because control part 10a inverts the clock signal output from comparator 50a to generate an FB_PWM signal, 0.91 V corresponds to FBduty=0.9 in the step-up control mode.

That is, according to said formula (2), an FF_PWM signal is fed to the primary circuit such that virtual Vin becomes 2.7 V (virtual Vin=output potential Vout×FBduty=3×0.9=2.7 V).

However, in practice, because a phase compensating capacitor C1 is not present, as shown in FIG. 12a, potential V40 of the output terminal immediately after time Tc gradually falls, and it takes certain time to reach the stable point of V40=0.91 V.

For example, if output potential V40 immediately after time Tc is the same as before time Tc, that is, 1.39 V, in the step-up control mode, because control part 10a inverts the clock signal output from comparator 50a to generate an FB_PWM signal, the duty ratio changes from 0.9 to 0.1 immediately after switching. On the other hand, as explained above, since an FF_PWM signal is fed to the primary circuit so that virtual Vin becomes 2.7 V, according to said formula (2), output potential Vout becomes $$V_{out} = VirtualVin / FBduty \quad (4)$$
$$= 2.7 \, V / 0.1$$
$$= 27 \, V$$

and output potential Vout overshoots.

The overshoot of said output potential Vout is cancelled when capacitor C1 is sufficiently discharged and potential V40 of the output terminal of transconductance amplifier 40 reaches a stable level of 0.91 V (corresponding to an FBduty of 0.9 in the step-up control mode), yet a ripple voltage is observed during this period.

That is, the duty ratio of the FB_PWM signal is set so that it is always 0.9. However, in practice, in the transient region immediately after switching of the control mode, a state with a duty ratio of 0.1 takes place, and a ripple voltage is observed during this period.

As explained above, for a switching power supply device in the prior art having a transconductance amplifier, at the time of switching from the step-down control mode to the step-up control mode, because a capacitor with a relatively large capacitance for phase compensation is connected to the output terminal of the transconductance amplifier, due to the influence of said capacitor, the potential of the output terminal of the amplifier cannot immediately follow the desired value. As a result, a ripple voltage takes place in the output. This is undesired.

The objective of the present invention is to solve the aforementioned problems of the prior art by providing a switching power supply device that has a reduced ripple voltage at the output when switching is performed between the step-up control mode and step-down control mode.

SUMMARY OF THE INVENTION

In order to realize the aforementioned objective, the present invention provides a type of switching power supply device characterized by the fact that it has the following parts: a first switching means composed of plural switching elements for controlling the ON state of the input side; a second switching means composed of plural switching elements for controlling the ON state of the output side; a feedback pulse generating means for generating a feedback pulse with a pulse width corresponding to the output potential; a first control means that performs the following operation: it switches plural control modes, which includes at least a step-down control mode and a step-up control mode, corresponding to the input potential; in said step-down control mode, said feedback pulse is sent to said first switching means; and, in said step-up control mode, said feedback pulse is sent to said second switching means, and a second control means that controls said feedback pulse generating means such that the duty ratio of said feedback pulse is constant and independent of said plural control modes.

As a preferable scheme, said feedback pulse generating means contains a transconductance amplifier having a first terminal with a voltage corresponding to the output potential input to it and a second terminal having a reference potential input to it; said second control means inverts the signs of the first terminal and second terminal of said transconductance amplifier corresponding to said step-down control mode and said step-up control mode.

Also, as a preferable scheme, said feedback pulse generating means contains a comparison circuit that compares the potential at the node connected to a capacitive element with a triangular signal having a prescribed period; and said transconductance amplifier is set such that the output terminal of said transconductance amplifier is positioned nearer the output side than said node.

According to the switching power supply device of the present invention, for the second control means, the input sign of the transconductance amplifier of the feedback pulse generating means is switched corresponding to the control mode. Consequently, an appropriate feedback is applied corresponding to the control mode, a stable constant current is output, and the duty ratio of the feedback pulse is constant independent of the control mode.

Also, for the switching power supply device of the present invention, the comparator of the feedback pulse generating means compares the potential of the output terminal of the transconductance amplifier connected to the capacitive element with the triangular signal with a prescribed period to generate said feedback pulse. Consequently, the potential level input to the comparator is stable independent of the charging state of said capacitive element. As a result, the duty ratio of the feedback pulse becomes constant.

REFERENCE NUMBERAL AS SHOWN IN THE DRAWINGS

Figure 1:
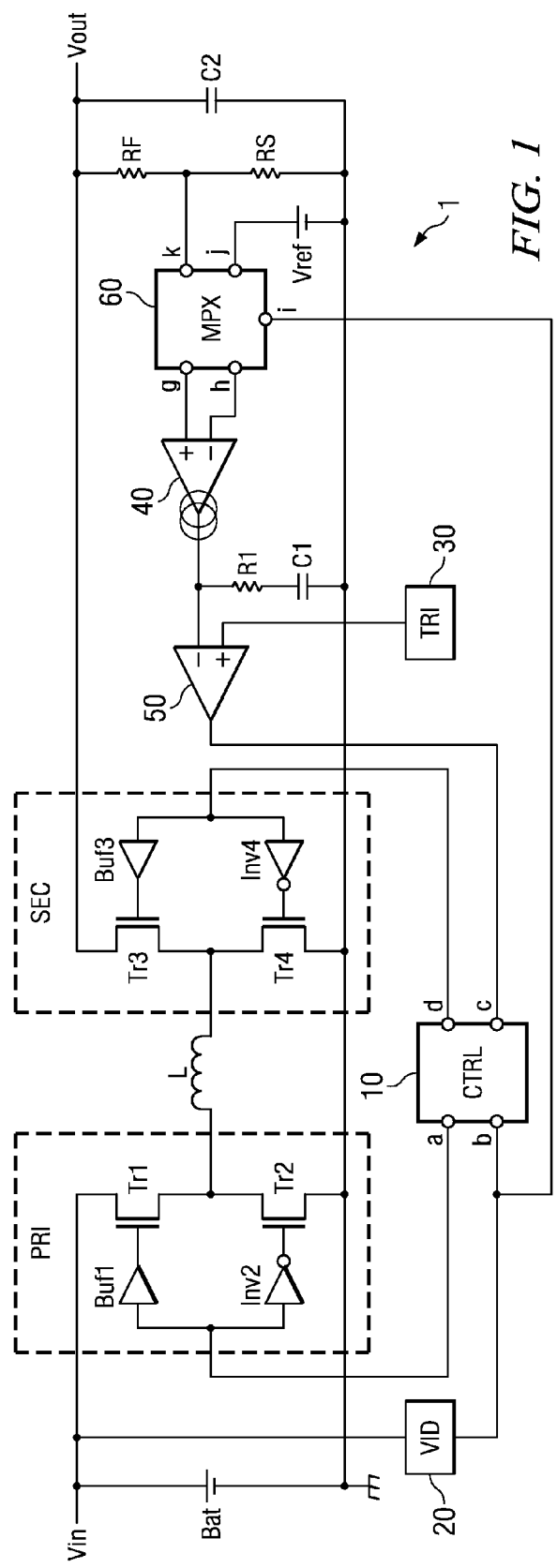
FIG. 1 is a diagram illustrating an example of constitution of the switching power supply device of an embodiment of the present invention.

In the figures, element 1, element 1a represents a switching power supply device; element 10, 10a represent a control parts (CTRL); elements 11–14 represent analog switches; element 15 represents a comparator (COMP); element 16 represents a FF_PWM generating part; element 17 represents a FB_PWM generating part; element 20 represents an input potential detecting part (VID); element 30 represents a triangular wave generating part (TRI); element 40 represents a transconductance amplifier; elements 50, 50a represents a comparator; element 60 represents a multiplexer (MPX); elements 61–64 represent analog switches, and element 65 represents a comparator (COMP).

DETAILED DESCRIPTION OF THE DRAWINGS

According to the present invention, the ripple voltage generated at the output when switching is performed between the step-up control mode and step-down control mode can be reduced. Consequently, it is possible to feed a stable power supply at all times to the load connected to the output terminal.

In the following, explanation will be provided for an embodiment of the switching power supply device of the present invention with reference to annexed figures.

FIG. 1 is a diagram illustrating an example of constitution of switching power supply device 1 of the present embodiment. Switching power supply device 1 shown in the FIGURE is a power supply device for obtaining a prescribed stable DC voltage based on a DC voltage over a wide range obtained from a battery (Bat in the figure), such as a nickel-mercury battery, set on the input side.

As shown in the figure, switching power supply device 1 is composed of an H bridge type switching circuit consisting of semiconductor switching elements Tr1, Tr2 set via inductance L to the input side, and semiconductor switching elements Tr3, Tr4 set on the output side. By controlling the ON state of said semiconductor switching elements, a step-up control mode and step-down control mode can be realized. For example, it is possible to control the semiconductor switching elements to obtain a stable 3 V output voltage based on an input voltage over a wide range of 1.5–5 V.

The primary circuit and secondary circuit to be explained later are an embodiment of the first switching means and second switching means of the present invention, respectively.

Control part (CTRL) 10 is an embodiment of the first control means of the present invention.

Multiplexer (MPX) 60 is an embodiment of the second control means of the present invention.

Transconductance amplifier 40 and comparator 50 are an embodiment of the feedback pulse generating means of the present invention.

The PWM control signal to be explained later is fed from control part 10 via buffer Buf1 and inverter Inv2 to semiconductor switching elements Tr1 and Tr2 set on the input side, respectively. Consequently, semiconductor switching elements Tr1 and Tr2 are controlled such that one of them is ON and the other OFF corresponding to the pulse width of the fed PWM control signal.

In the following, the controller on the input side and composed of semiconductor switching elements Tr1, Tr2, buffer Buf1 and inverter Inv2 shown in FIG. 1 will be referred to as primary circuit (PRI).

The PWM control signal to be explained later is fed from control part 10 via buffer Buf3 and inverter Inv4 to semiconductor switching elements Tr3 and Tr4 set on the output side, respectively. Consequently, semiconductor switching elements Tr3 and Tr4 are controlled such that one of them is ON and the other OFF corresponding to the pulse width of the fed PWM control signal.

In the following, the controller on the input side and composed of semiconductor switching elements Tr3, Tr4, buffer Buf3 and inverter Inv4 shown in FIG. 1 will be referred to as secondary circuit (SEC).

Input potential detecting part 20 detects input potential Vin based on a prescribed reference potential, and feeds the detected input potential Vin to control part 10 and multiplexer 60. As to be explained later, control part 10 switches the control mode corresponding to input potential Vin detected by input potential detecting part 20.

As shown in the figure, multiplexer 60 contains at least 5 terminals, that is, terminal g—terminal k, and, corresponding to detected potential Vin of input potential detecting part 20 input from terminal i, control is performed to switch the connection state between terminals g and h and terminals k and j.

More specifically, when input potential Vin is higher than target output potential Vout (Vin>Vout), control is performed such that an ON connection exists between terminals g and k and between terminals h and j. On the other hand, when input potential Vin is lower than target output potential Vout (Vin<Vout), control is performed such that an ON connection exists between terminals g and j and between terminals h and k.

Figure 2:
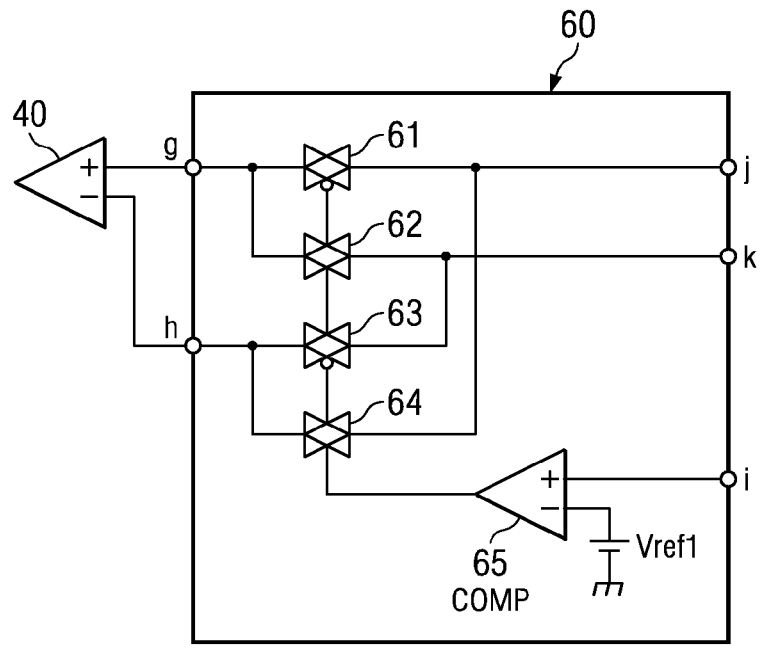
FIG. 2 is a diagram illustrating an example of constitution of the multiplexer of the switching power supply device in the embodiment.

FIG. 2 is a diagram illustrating an example of the circuit of multiplexer 60.

As shown in FIG. 2, multiplexer 60 is composed of four analog switches 61–64 and comparator (COMP) 65.

In the example of circuit constitution shown in the figure, when detected potential Vin of input potential detecting part 20 input from terminal i is higher than reference potential Vref1 (set at target output potential Vout), comparator 65 outputs the H level, so that analog switches 62 and 64 are turned ON, and analog switches 61 and 63 are turned OFF. As a result, the connection between terminals g and terminal k is ON, and the connection between terminals h and j is ON.

Also, when detected potential Vin of input potential detecting part 20 input from terminal i is lower than reference potential Vref1 (set at target output potential Vout), comparator 65 outputs the L level, so that analog switches 61 and 63 are turned ON, and analog switches 62 and 64 are turned OFF. As a result, the connection between terminals g and terminal j is ON, and the connection between terminals h and k is ON.

Transconductance amplifier 40 is a Gm amplifier.

As shown in the figure, the positive terminal of transconductance amplifier 40 is connected to terminal g of multiplexer 60, and the negative terminal is connected to terminal h of multiplexer 60.

Consequently, in transconductance amplifier 40, prescribed reference voltage Vref or a potential obtained by voltage dividing output potential Vout by resistors RF and RS is input as it is switched between the positive terminal and negative terminal corresponding to detected potential Vin of input potential detecting part 20.

Connected to the output terminal of transconductance amplifier 40 are resistor R1 that generates a potential corresponding to the current output from transconductance amplifier 40, and capacitor C1 as the capacitive element of the present invention for phase compensation and connected in series to resistor R1. Phase compensating capacitor C1 should have a relatively large capacitance, such as a capacitance of about 10 nF.

The output terminal of transconductance amplifier 40 is connected to the negative terminal of comparator 50. Consequently, the negative terminal of comparator 50 becomes the phase compensated potential of the output terminal of transconductance amplifier 40. On the other hand, a triangular wave signal at a prescribed period and with a prescribed amplitude and generated in triangular generating part 30 is input to the positive terminal of comparator 50.

As a result, comparator 50 generates a clock signal with a duty ratio corresponding to the potential of the output terminal of transconductance amplifier 40. As shown in FIG. 1, the output terminal of comparator 50 is connected to external terminal c of control part 10. As to be explained later, said clock signal is fed as an FB_PWM signal to one of the primary circuit and secondary circuit corresponding to the control mode.

Different from switching power supply device 1a in the prior art, for switching power supply device 1 of the present embodiment, independent of the control mode, the clock signal generated by comparator 50 is not subject to inversion treatment.

Control part 10 switches the following three control modes corresponding to input potential Vin detected by input potential detecting part 20.

(1) Step-down Control Mode

For example, if input potential Vin is in the range of 4–5 V and the target output potential Vout is 3 V, the step-down control mode of operation is performed.

In the step-down control mode, semiconductor switching element Tr3 of the secondary circuit is always ON, semiconductor switching element Tr4 is always OFF, and, by controlling the duty ratio of the clock signal provided to the primary circuit corresponding to output potential Vout, the average potential on the input side (virtual potential Vin) is controlled.

(2) Step-up Control Mode

For example, if input potential Vin is in the range of 1.5–2.7 V and the target output potential Vout is 3 V, the step-up control mode of operation is performed.

In the step-up control mode, semiconductor switching element Tr1 of the secondary circuit is always ON, semiconductor switching element Tr2 is always OFF, and, by controlling the duty ratio of the clock signal provided to the secondary circuit corresponding to output potential Vout, the average potential on the output side (virtual potential Vout) is controlled.

(3) Step-down/Step-Up Control Mode

For example, if input potential Vin is in the range of 2.7–4 V and the target output potential Vout is 3 V, the step-down/step-up control mode is performed.

In the step-down/step-up control mode, depending on the relationship between input potential Vin and output potential Vout, control is performed for successive switching of the step-down control mode and step-up control mode.

That is, in the step-down/step-up control mode, when it is judged that input potential Vin is higher than target output potential Vout (Vin>Vout), control is performed to switch the control mode to the step-down control mode. On the other hand, when it is judged that input potential Vin is lower than target output potential Vout (Vin<Vout), control is performed to switch the control mode to the step-up control mode.

In this case, different from said step-down control mode (1) and step-up control mode (2), the duty ratio of the clock signal provided to both the primary circuit and secondary circuit is controlled.

Switching power supply device 1 of the present embodiment has a characteristic feature of the switching operation of the control mode in the step-down/step-up control mode. Consequently, in the following, explanation will be provided for control part 10 in the step-down/step-up control mode.

In the following, when the step-down control mode/step-up control mode is mentioned, it refers to a step-down control mode/step-up control mode in the step-down and step-up control modes.

Figure 3:
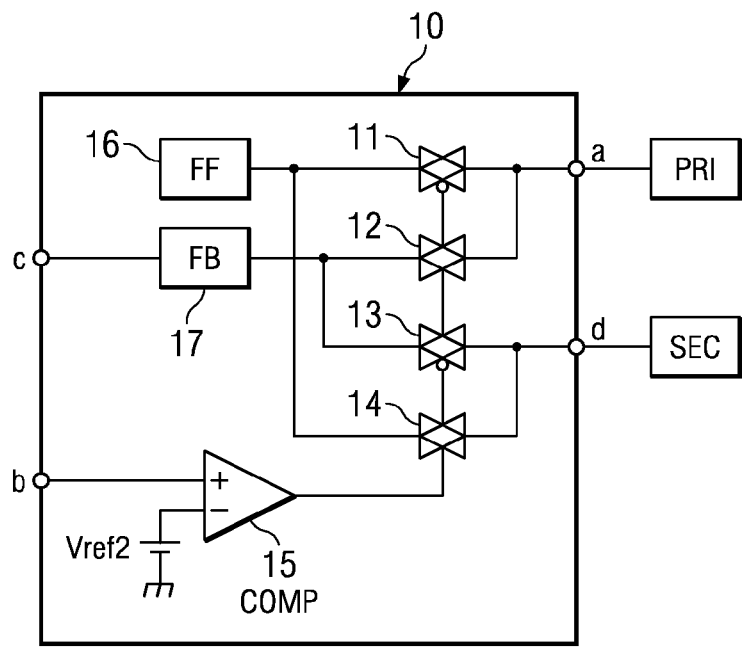
FIG. 3 is a diagram illustrating an example of constitution of the circuit of the control part when the switching power supply device operates in the step-down/step-up control mode.

FIG. 3 is a diagram illustrating an example of the constitution of the circuit of control part 10 that operates in the aforementioned step-down/step-up control mode.

As shown in FIG. 3, control part 10 can have a constitution composed of four analog switches 11–14, comparator (COMP) 15, FF_PWM generating part 16, and FB_PWM generating part 17.

FF_PWM generating part 16 outputs an FF_PWM signal with a prescribed duty ratio independent of the step-down control mode/step-up control mode at a prescribed timing, such as the inverted timing of the timing of the output of the FB_PWM signal.

In FB_PWM generating part 17, a clock signal fed from comparator 50 is input via terminal c, and, after control of the timing, an FB_PWM signal with a duty ratio equal to that of the input clock signal is output.

In the example circuit constitution shown in FIG. 3, when detected potential Vin of input potential detecting part 20 input from terminal b is higher than reference voltage Vref2 (set at target output potential Vout), comparator 15 outputs the H level, so that analog switches 12 and 14 come ON, and analog switches 11 and 13 go OFF. As a result, the FF_PWM signal output from FF_PWM generating part 16 is fed via terminal d to the secondary circuit, and the FB_PWM signal output from FB_PWM generating part 17 is fed via terminal a to the primary circuit.

Also, when detected potential Vin of input potential detecting part 20 input from terminal i is lower than reference voltage Vref2 (set at target output potential Vout), comparator 15 outputs the L level, so that analog switches 11 and 13 come ON, and analog switches 12 and 14 go OFF. As a result, the FF_PWM signal output from FF_PWM generating part 16 is fed via terminal a to the primary circuit, and the FB_PWM signal output from FB_PWM generating part 17 is fed via terminal d to the secondary circuit.

Consequently, in the step-down control mode, control part 10 feeds the clock signal (FB_PWM signal) output from comparator 50 to the primary circuit, and, simultaneously, it feeds the FF_PWM signal with an appropriate pulse width to obtain the virtual output potential Vout (virtual Vout) at the secondary circuit.

Virtual Vout is the average potential on the side of the secondary circuit, and the following relationship is established.

$$\text{Virtual Vout} = \text{Vin} \times FB \text{ duty} \tag{5}$$

On the other hand, in the step-up control mode, control part 10 feeds the clock signal (FB_PWM signal) output from comparator 50 to the secondary circuit, and, simultaneously, it feeds the FF_PWM signal with an appropriate pulse width for obtaining virtual input potential Vin (virtual Vin) at the primary circuit.

Also, virtual Vin is the average potential on the side of the primary circuit, and the following relationship is established.

$$\text{Virtual Vin} = \text{Vout} \times FB \text{duty} \tag{6}$$

Figure 4:
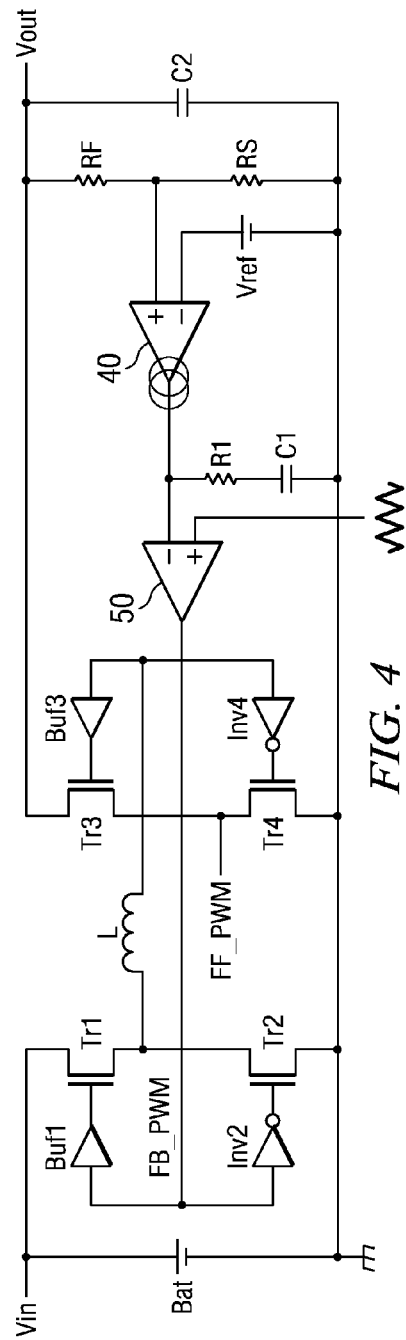
FIG. 4 is a diagram illustrating the equivalent circuit when the switching power supply device of the embodiment operates in the step-down control mode.

FIG. 4 is a diagram illustrating the equivalent circuit showing the connection state and the feeding state of the PWM signal when switching power supply device 1 operates in the step-down control mode.

As shown in the figure, in the step-down control mode with input potential Vin higher than target output potential Vout, while an FB_PWM signal with duty ratio (FBduty) corresponding to output potential Vout is fed to the primary circuit, an FF_PWM signal is fed to the secondary circuit. As a result, switching power supply device 1 performs step-down control to obtain target output potential Vout.

Also, when input potential Vin is higher then target output potential Vout, the connection state becomes as shown in the figure, and multiplexer 60 operates.

Figure 5:
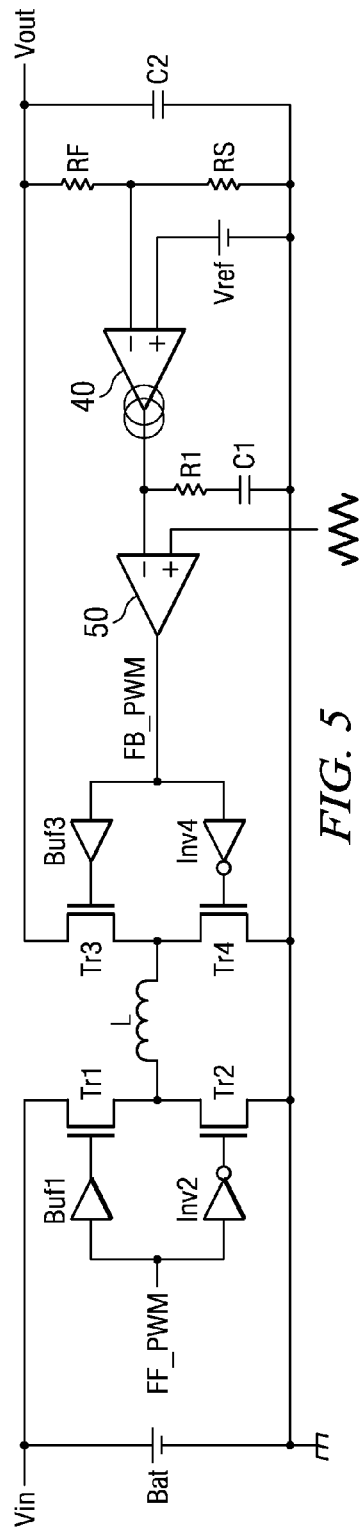
FIG. 5 is a diagram illustrating the equivalent circuit when the switching power supply device of the embodiment operates in the step-up control mode.

FIG. 5 is a diagram illustrating the equivalent circuit showing the connection state and the feeding state of the PWM signal when switching power supply device 1 operates in the step-up control mode.

When input potential Vin is lower than target output potential Vout, the control mode becomes the step-up control mode. As shown in the figure, while an FB_PWM signal of the duty ratio (FBduty) corresponding to the output voltage is fed to the secondary circuit, an FF_PWM signal is fed to the primary circuit. As a result, switching power supply device 1 performs the step-up control mode of operation to obtain target output potential Vout.

In this case, immediately after input potential Vin becomes lower than target output potential Vout, multiplexer 60 switches the connection state of the positive terminal/negative terminal of transconductance amplifier 40. However, in order to simplify the description, in transconductance amplifier 40 shown in FIG. 5, the connection state of the various terminals with the exterior is the same as that in FIG. 4, and the positive terminal and negative terminal are reversed in the description with respect to transconductance amplifier 40 shown in FIG. 4.

In the following, explanation will be provided for the operation of switching power supply device 1 when control part 10 switches the mode from the step-down control mode to the step-up control mode with reference to FIG. 6.

Figure 6:
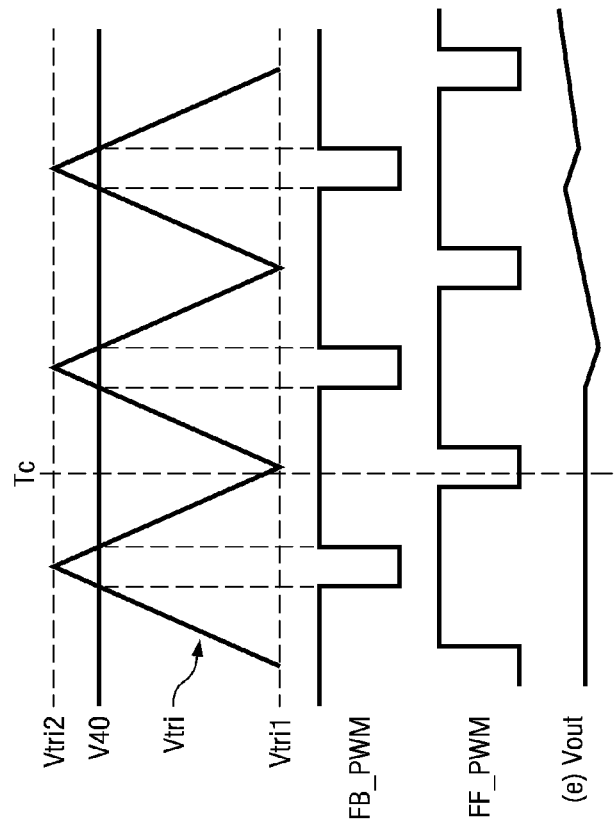
FIG. 6 includes timing charts of signal waveforms before and after switching time Tc of the control mode in the switching power supply device of the embodiment. (a) shows potential V40 at the output terminal of transconductance amplifier 40; (b) shows triangular signal Vtri input to comparator 50; (c) shows an FB_PWM signal; (d) shows an FF_PWM signal, and (e) shows output potential Vout.

FIG. 6 is a timing chart illustrating signal waveforms before and after switching time Tc of the control mode. (a) shows potential V40 at the output terminal of transconductance amplifier 40; (b) shows triangular signal Vtri input to comparator 50; (c) shows the FB_PWM signal; (d) shows the FF_PWM signal; and (e) shows output potential Vout. The maximum potential of triangular signal Vtri is designated Vtri2, and its minimum potential is designated Vtri1.

As shown in FIG. 6, before time Tc, the relationship of input potential Vin>output potential Vout exists, and control part 10 operates in the step-down control mode. After time Tc, the relationship of input potential Vin<output potential Vout exists, and control part 10 operates in the step-up control mode. In this case, duty ratio FBduty of the FB_PWM signal is continuously set at 0.9.

Before time Tc, in order to stabilize potential V40 of the output terminal of transconductance amplifier 40, an FB_PWM signal with duty ratio FBduty shown in following formula (7) is fed to the primary circuit.

$$FBduty=1-(V40-Vtri1)/(Vtri2-Vtri1) \qquad (7)$$

For example, if Vtri2=1.45 V and Vtri1=0.85 V, when duty ratio FBduty of the FB_PWM signal is said 0.9, according to said formula 7, one has V40=0.91 V.

Then, at time Tc when input potential Vin falls to have the relationship of input potential Vin>target output potential Vout, control part 10 starts the operation of switching to the step-up control mode of operation, and FBduty is controlled to be maintained at 0.9.

In this case, because multiplexer 60 performs the switching operation for the connection state to the positive terminal/negative terminal of transconductance amplifier 40, as shown in FIG. 6(a), it is possible to realize a constitution in which while potential V40 of the output terminal of transconductance amplifier 40 is kept at 0.91 V (FBduty=0.9), feedback is applied to the control modes before and after the switching.

In this case, before and after switching of the control mode, there is no change in potential V40 of the output terminal of transconductance amplifier 40, and, before and after switching, there is no change in the charging state of phase compensating capacitor C1 connected to the output terminal of transconductance amplifier 40. That is, before and after switching, the potential of capacitor C1 is kept at 0.91 V.

Consequently, immediately after time Tc, the value of duty ratio FBduty is not influenced by the charging potential of capacitor C1. Consequently, the relationship of said formula (6) can always be maintained. As a result, as shown in FIG. 6(e), the ripple generated in output potential Vout is very small.

In the above, explanation has been provided for the case when duty ratio FBduty is set at 0.9 as an example. However, one can select any duty ratio. When the duty ratio is selected at will, transconductance amplifier 40 outputs a current corresponding to the duty ratio, and the potential at its output terminal is kept constant. Consequently, for any selected duty ratio, the ripple generated in output potential Vout is very small.

In the above explanation of embodiment, operation in the case of switching from the step-down control mode to the step-up control mode has been described. The same effect can be realized in reducing the ripple voltage generated on the output when switching is made from the step-up control mode to the step-down control mode.

For example, as an example of the results of simulation, when a comparison is made of the ripple voltage that is generated in switching from the step-down control mode to the step-up control mode, while it is 1.4 V in the switching power supply device of the prior art, it is 13 mV in the switching power supply device of the present embodiment. Also, when a comparison is made of the ripple voltage generated in switching from the step-up control mode to the step-down control mode, while it is 0.2 V in the switching power supply device of the prior art, it becomes 20 mV in the switching power supply device of the present embodiment. Consequently, it can be seen that significant improvement is realized for both changes of the control mode.

As explained above, for switching power supply device 1 in the present embodiment, for the step-down control mode/step-up control mode of the FB_PWM signal corresponding to the output potential, feedback is provided for the primary circuit/secondary circuit. In this case, multiplexer 60 for switching the input sign of transconductance amplifier 40 corresponding to the control mode is present, so that before and after switching of the control mode, there is no variation in the output potential of transconductance amplifier 40, that is, the duty ratio of the FB_PWM signal is kept constant, while it is possible to apply negative feedback in each control mode.

Switching power supply device 1 of the present embodiment has capacitor C1 with a relatively large capacitance for phase compensation at the output terminal of transconductance amplifier 40. The output potential of transconductance amplifier 40 is always kept constant independent of the control mode. Consequently, the duty ratio of the generated FB_PWM signal is constant and independent of the charging state of capacitor C1.

That is, before and after switching of the control mode, the ripple voltage generated in the output is very small and free of the influence of the transient characteristics of the charging voltage of capacitor C1. Consequently, it is possible to realize both phase compensation of the feedback system and reduction of the ripple voltage, properties that have formerly been opposed to each other.

The embodiment of the present invention is not limited to the aforementioned contents. Various modifications can be made as long as the gist of the present invention is observed.

Figure 7:
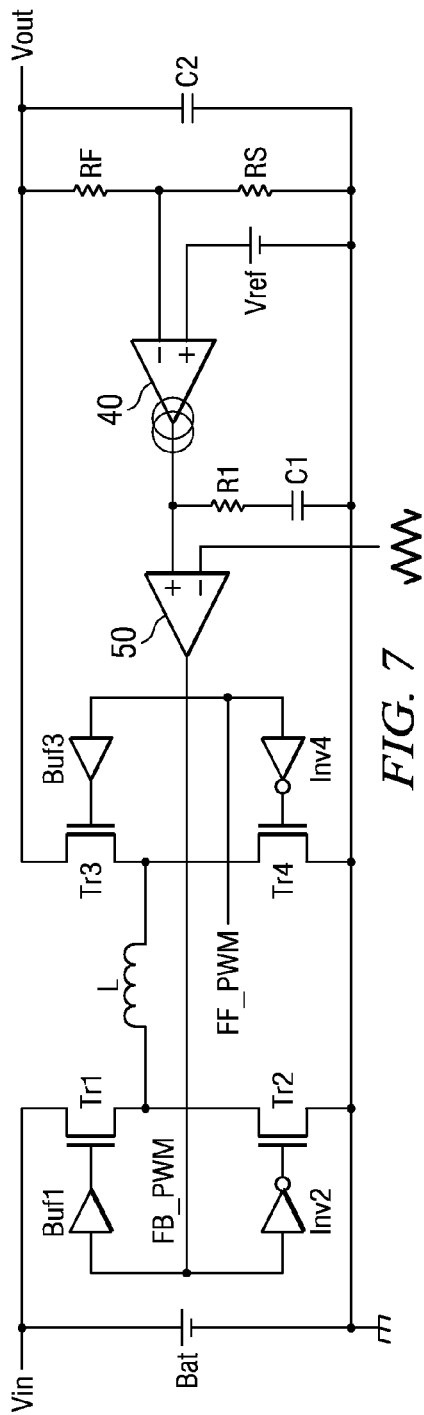
FIG. 7 is a diagram illustrating the equivalent circuit when the switching power supply device in the modified example operates in the step-down control mode.
Figure 8:
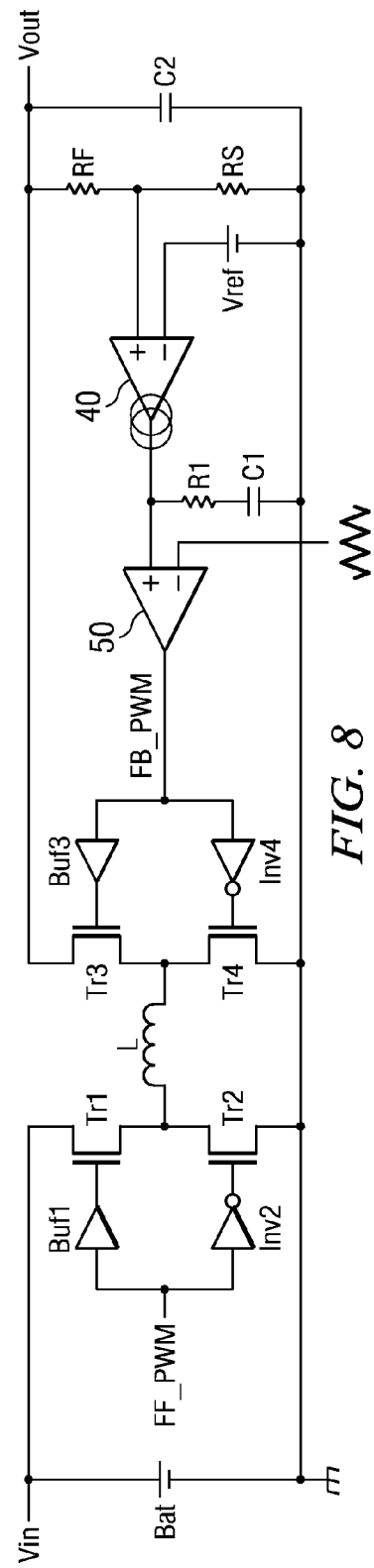
FIG. 8 is a diagram illustrating the equivalent circuit when the switching power supply device in the modified example operates in the step-up control mode.
Figure 9:
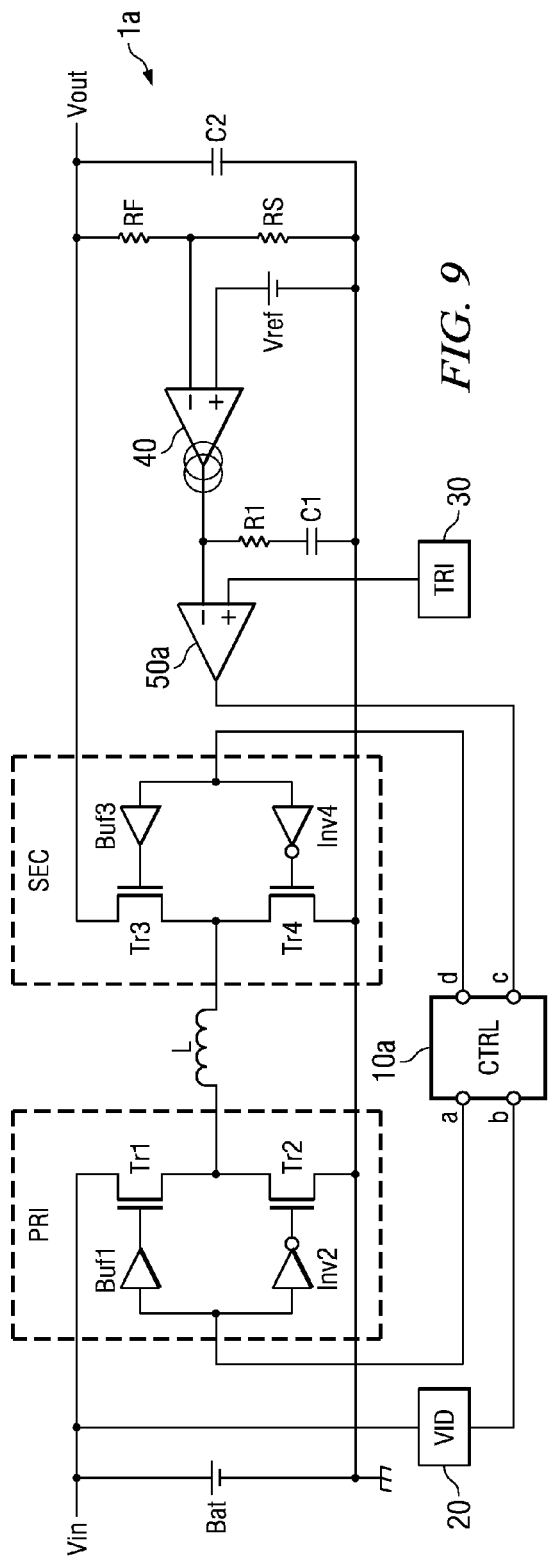
FIG. 9 is a diagram illustrating an example of constitution of a switching power supply device in the prior art.
Figure 10:
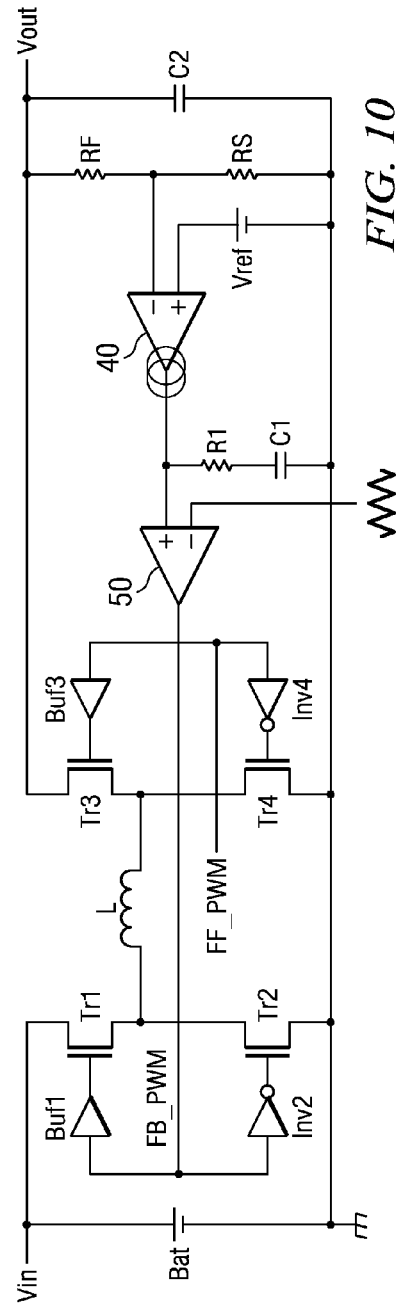
FIG. 10 is a diagram illustrating the connection state and feeding state of the PWM signal when the switching power supply device in the prior art operates in the step-down control mode.
Figure 11:
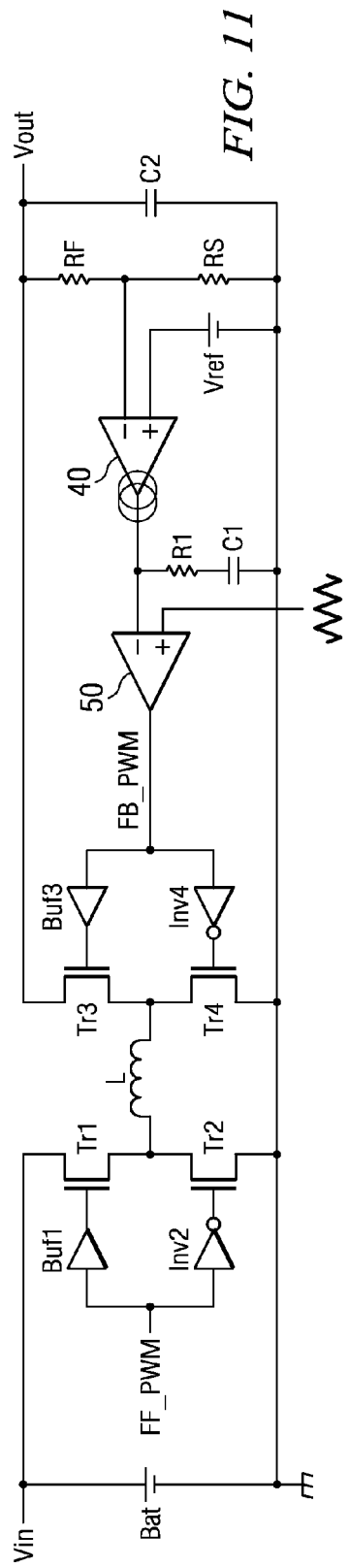
FIG. 11 is a diagram illustrating the connection state and feeding state of the PWM signal when the switching power supply device in the prior art operates in the step-up control mode.
Figure 12:
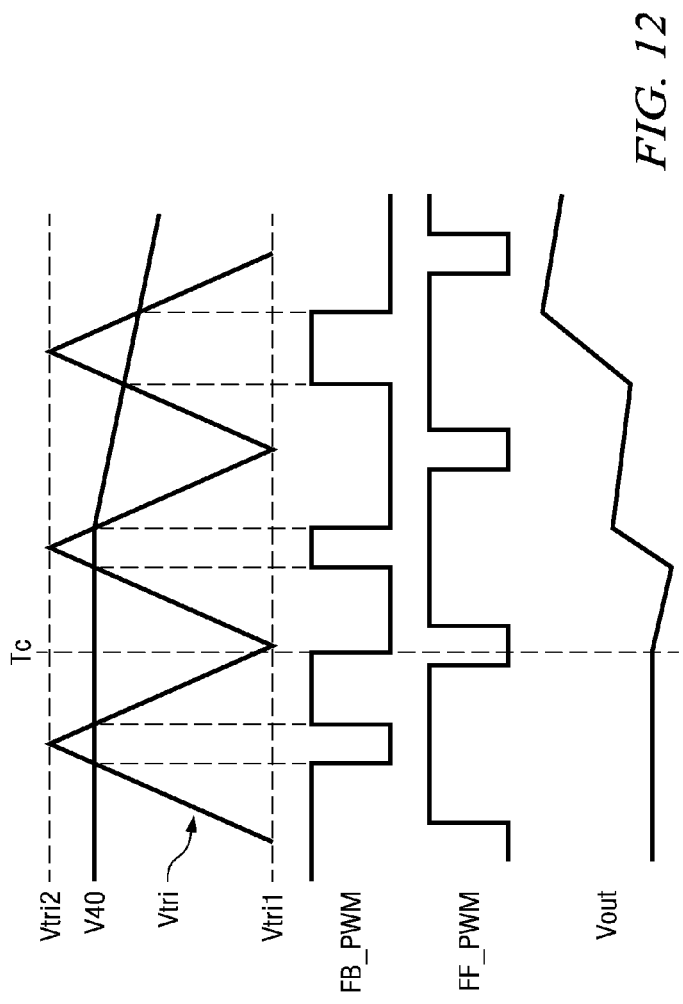
FIG. 12 includes timing charts of signal waveforms before and after switching time Tc of the control mode in the switching power supply device of the prior art. (a) shows potential V40 at the output terminal of transconductance amplifier 40; (b) shows triangular signal Vtri input to comparator 50a; (c) shows the FB_PWM signal; (d) shows the FF_PWM signal, and (e) shows output potential Vout.

For example, FIG. 7 shows the equivalent circuit when the switching power supply device in a modified example is in the step-down control mode of operation. FIG. 8 shows the equivalent circuit when the switching power supply device in the modified example is in the step-up control mode of operation.

The switching power supply devices shown in FIGS. 7 and 8 differ from switching power supply device 1 shown in FIGS. 4 and 5 in that the signs of the input terminals of transconductance amplifier 40 are reversed. That is, in the constitution shown in FIG. 7, the potential obtained by voltage dividing output potential Vout is fed back to the negative terminal. In the constitution shown in FIG. 8, the potential obtained by voltage dividing output potential Vout is fed back to the positive terminal.

Also, the signs of comparator 50 are reversed with respect to those in switching power supply device 1 shown in FIGS. 4 and 5 so as to form a negative feedback.

In this modified example, too, just as in said switching power supply device 1, the output potential of transconductance amplifier 40 is always kept constant independent of the control mode. Consequently, independent of the charging state of capacitor C1, the duty ratio of the FB_PWM signal generated in this case is constant. As a result, before and after switching of the control mode, the ripple voltage generated in the output is very small and free of influence of the transient characteristics of the charging voltage of capacitor C1.

The invention claimed is:

1. A switching power supply comprising:
   a first switching circuit having plural switching elements for controlling an ON state of an input side;
   a second switching circuit having plural switching elements for controlling an ON state of an output side;
   a feedback pulse generating circuit for generating a feedback pulse with a pulse width corresponding to an output potential;
   a first control circuit to switch plural control modes, which includes at least a step-down control mode and a step-up control mode, corresponding to an input potential; in said step-down control mode, said feedback pulse is sent to said first switching means; and, in said step-up control mode, said feedback pulse is sent to said second switching means;
   and a second control circuit for controlling said feedback pulse generating means such that a duty ratio of said feedback pulse is constant and independent of said plural control modes.

2. The switching power supply device described in claim 1 wherein:
   said feedback pulse generating circuit contains a transconductance amplifier having a first terminal with a voltage corresponding to the output potential input to it and a second terminal having a reference potential input to it;
   and said second control circuit inverts the signs of the first terminal and second terminal of said transconductance amplifier corresponding to said step-down control mode and said step-up control mode.

3. The switching power supply device described in claim 2 wherein:
   said feedback pulse generating circuit contains a comparison circuit that compares the potential at a node connected to a capacitive element with a triangular signal having a prescribed period;
   and said transconductance amplifier is set such that the output terminal of said transconductance amplifier is positioned nearer the output side than said node.

4. A type of switching power supply device, comprising:
   a first switching element connected between the voltage input terminal and one of the terminals of an inductance element,
   a second switching element connected between said one terminal of the inductance element and a reference potential;
   a third switching element connected between the voltage output terminal and the other terminal of the inductance element;
   a fourth switching element connected between said other terminal of the inductance element and the reference potential;
   a feed-forward controller for feeding a forward control signal to said third switching element and fourth switching element or said first switching element and second switching element;
   and a feedback controller for feeding a feedback control signal to said first switching element and second switching element or said third switching element and fourth switching element;
   in the step-down mode of operation, said feed-forward control signal is fed to said third switching element and fourth switching element, and, simultaneously, said feedback control signal is fed to said first switching element and second switching element; and, in the step-up mode of operation, said feed-forward control signal is fed to said first switching element and second switching element, and, simultaneously, said feedback control signal is fed to said third switching element and fourth switching element;
   in this switching power supply device, said feedback controller has a comparison circuit having a first terminal and a second terminal with signs opposite each other; in the step-down mode of operation, a voltage corresponding to the output voltage is fed to said first terminal, and, simultaneously, a reference voltage is fed to said second terminal; and, in the step-up mode of operation, the reference voltage is fed to said first terminal, and, simultaneously, a voltage corresponding to the output voltage is fed to said second terminal.

5. The switching power supply device described in claim 4 wherein:
   said feedback controller has a comparator that takes the output signal of said comparison circuit and a triangular signal as input and generates a feedback control signal, and said comparison circuit is a current output type amplifier.

6. The switching power supply device described in claim 4 wherein:
   said feedback controller has an input switching circuit that switches the connection between said first terminal and second terminal of said comparison circuit to the voltage corresponding to the output voltage and the reference voltage.

* * * * *